United States Patent
Asano et al.

(10) Patent No.: US 8,305,683 B2
(45) Date of Patent: Nov. 6, 2012

(54) POLARIZER

(75) Inventors: Kosuke Asano, Utsunomiya (JP);
Taisuke Isano, Utsunomiya (JP);
Yasushi Kaneda, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/616,719

(22) Filed: Nov. 11, 2009

(65) Prior Publication Data
US 2010/0118392 A1 May 13, 2010

(30) Foreign Application Priority Data
Nov. 13, 2008 (JP) ................................ 2008-291105

(51) Int. Cl.
*G02B 5/30* (2006.01)
(52) U.S. Cl. .................................. 359/352; 359/485.05
(58) Field of Classification Search .................. 359/352, 359/486, 485.05, 487.03
See application file for complete search history.

(56) References Cited

U.S. PATENT DOCUMENTS

| | | | |
|---|---|---|---|
| 3,402,979 A | 9/1968 | Yoh-Han Pao | |
| 4,712,881 A * | 12/1987 | Shurtz et al. .................. | 359/352 |
| 6,243,199 B1 * | 6/2001 | Hansen et al. ................. | 359/486 |
| 6,785,050 B2 * | 8/2004 | Lines et al. .................... | 359/486 |
| 7,113,336 B2 * | 9/2006 | Crosby .......................... | 359/486 |
| 7,268,946 B2 * | 9/2007 | Wang ............................. | 359/569 |
| 7,561,332 B2 * | 7/2009 | Little et al. .................... | 359/486 |
| 2004/0174596 A1 * | 9/2004 | Umeki .......................... | 359/484 |
| 2005/0190445 A1 * | 9/2005 | Fukuzaki ....................... | 359/486 |
| 2007/0183035 A1 * | 8/2007 | Asakawa et al. .............. | 359/486 |
| 2007/0242352 A1 | 10/2007 | MacMaster | |
| 2008/0111483 A1 * | 5/2008 | Kim et al. ...................... | 313/506 |
| 2009/0128904 A1 * | 5/2009 | Uejima et al. ................. | 359/486 |

FOREIGN PATENT DOCUMENTS

| | | |
|---|---|---|
| EP | 1918742 A1 | 5/2008 |
| JP | 2008-090238 A | 4/2008 |
| WO | 2008/022099 A2 | 2/2008 |

OTHER PUBLICATIONS

Z. Y. Yang & Y. F. Lu "Broadband nanowire-grid polarizers in ultra-violet-visible-near-infrared regions" (Optics Express vol. 15, No. 15, pp. 9510-9519).

* cited by examiner

*Primary Examiner* — Ricky D Shafer
(74) *Attorney, Agent, or Firm* — Canon USA, Inc., IP Division

(57) ABSTRACT

A polarizer of the present invention having a higher level of polarization performance for a light in the deep ultraviolet wavelength range includes: a substrate transparent to deep ultraviolet light; and a periodic structure including a plurality of structural elements at predetermined intervals on the substrate, the polarizer being configured so that the deep ultraviolet light incident thereon is split into a light component reflected by the periodic structure and a light component passing between the structural elements adjacent to each other, and the periodic structure being composed of chromium oxide or tungsten.

5 Claims, 9 Drawing Sheets

POLARIZER

BACKGROUND OF THE INVENTION

1. Field of the Invention

The present invention relates to a polarizer controlling polarization of light in the deep ultraviolet region.

2. Description of the Related Art

Polarizers are roughly categorized into prism polarizers and film polarizers.

Prism polarizers take advantages of birefringence and Brewster's angle to have excellent polarization characteristics. The prism polarizers, however, are thick and require a large installation space. Moreover, they have a limited incident angle which allows only polarization of normally-incident light, i.e. no obliquely-incident light is polarized.

On the contrary, film polarizers can be formed as a thin device requiring a smaller installation space, and have a larger incident angle which allows polarization of obliquely-incident light. A film polarizer is formed, for example, by rolling in one direction a glass substrate which has conductive particles such as silver halide particles mixed therein, and forming the particles into an elongated shape. These elongated silver halide particles produce anisotropy of electrical conductivity that imparts polarization characteristics to the film polarizer.

A wire grid polarizer is another type of the well-known film polarizers. This polarizer includes a glass substrate on which metal wires, e.g., aluminum wires, are placed equally spaced, and is provided with anisotropy of electrical conductivity as in the above described film polarizer. Such wire grid polarizers are discussed in Japanese Patent Application Laid-Open No. 2008-90238, and Z.Y. Yang et al., "Broadband Nanowire-grid Polarizers In Ultraviolet-Visible-Near-Infrared Regions," (OPTICS EXPRESS Vol. 15, No. 15, pp. 9510-9519). In the latter publication, a polarizer is described in which metal wires of gold, silver, chrome, and aluminum are formed to have a pitch of 80 nm for the wavelength range from ultraviolet to near infrared (300 nm to 5 μm). The publication also discusses another structure that includes a $CaF_2$ substrate having a wire grid of aluminum thereon.

Conventionally, these prism and film polarizers have been discussed to control polarization of visible light, infrared light, and ultraviolet light.

Exposure equipment uses light having a wavelength shorter than that of ultraviolet light (300 nm to 380 nm) to form more fine patterns. For example, the wavelength may be KrF (248 nm), ArF (193 nm), $F_2$ (157 nm), or $Ar_2$ (126 nm), for example. A polarizer is used in a polarized-light illumination system or an interferometer for stage position measurement of the exposure equipment that uses light in the above wavelength range as exposure light.

A film polarizer with elongated silver halide particles requires a substrate of fluorite ($CaF_2$) or fluorine-doped quartz glass ($SiO_2$) that is also highly transparent to ultraviolet light. In such a case, the substrate cannot be rolled with silver halide particles mixed therein. As a result, no elongated silver halide particle is formed and anisotropy cannot be imparted.

In addition, even the wires of the metals described in the above "Broadband Nanowire-grid Polarizers In Ultraviolet-Visible-Near-Infrared Regions" cannot realize excellent polarization characteristics for the wavelength range of deep ultraviolet. The wire grid polarizers have been used so far for infrared light. However, these polarizers cannot have closely-spaced metal wires or a high aspect ratio for light in the deep ultraviolet wavelength range, resulting in poor polarization characteristics for the light.

SUMMARY OF THE INVENTION

The present invention provides a polarizer having a higher level of polarization performance for light in the deep ultraviolet wavelength range.

The present invention provides a polarizer with a grid section composed of chromium oxide or tungsten.

A polarizer according to an aspect of the present invention includes a substrate transparent to deep ultraviolet light; and a periodic structure including a plurality of structural elements at predetermined intervals on the substrate, wherein the polarizer is configured so that the deep ultraviolet light incident thereon is split into a light component reflected by the periodic structure and a light component passing between the structural elements adjacent to each other, in accordance with the polarization direction of the light, and the periodic structure is composed of chromium oxide or tungsten.

The polarizer according to an exemplary embodiment of the present invention realizes a high level of polarization performance for light in the deep ultraviolet wavelength region.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

A polarizer according to an exemplary embodiment of the present invention includes a substrate transparent to deep ultraviolet light, and a periodic structure including a plurality of structural elements on the substrate. The periodic structure functions to split the deep ultraviolet light incident thereon into a light component to be transmitted and a light component to be reflected in accordance with the polarization direction of the light. In an exemplary embodiment of the present invention, the periodic structure is composed of chromium oxide or tungsten, providing a higher extinction ratio and improved polarization performance to the polarizer, as compared to the conventional polarizer with a periodic structure composed of aluminum or silver.

The term "deep ultraviolet light" as used herein refers to light having a wavelength of from 190 nm to 300 nm. The periodic structure includes long structural elements that are periodically arranged at equal intervals. The chromium oxide used in exemplary embodiments of the present invention means chromium oxide (III) ($Cr_2O_3$).

Figure 1:
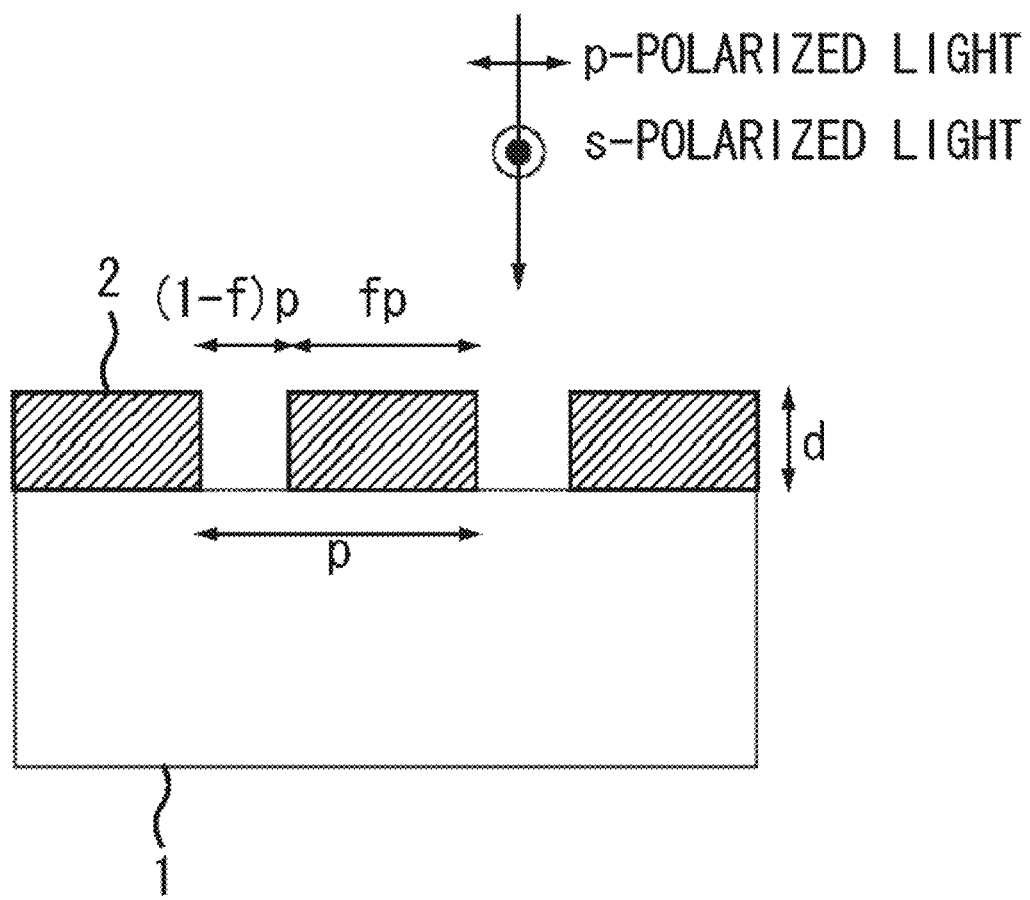
FIG. 1 is a schematic cross-sectional diagram illustrating the structure of a polarizer according to an exemplary embodiment of the present invention.

FIG. 1 is a schematic cross-sectional diagram illustrating the structure of a polarizer according to an exemplary embodiment of the present invention. In FIG. 1, the polarizer includes a substrate 1 and a periodic structure 2.

The substrate 1 is transparent to deep ultraviolet light. The substrate preferably has a transmittance of deep ultraviolet light of 99% or more. The substrate is preferably composed of fluorite ($CaF_2$) or fluorine-doped quartz glass ($SiO_2$).

The periodic structure 2 is formed on the substrate 1, and includes long structural elements periodically arranged at equal intervals. In FIG. 1, the periodic structure 2 has a rectangular cross section, but the periodic structure 2 of the present invention is not limited to rectangular and may have a trapezoidal or triangular cross section, for example. The structural elements may be connected to one another at an end portion of the substrate, or may be independent of one another. The substrate 1 is exposed between adjacent structural elements, so that deep ultraviolet light incident on the exposed substrate passes through the substrate.

The periodic structure 2 has a height d, a pitch p, and a filling factor (the area ratio of the periodic structure 2 to the area of the substrate 1) f: and two adjacent structural elements are separated from each other by an interval of (1−f)p. The periodic structure can have a desired transmittance and a desired extinction ratio by appropriately setting height d and a filling factor f.

When the pitch p is equal to or smaller than a target wavelength of the polarizer, the electric field vector component of the light that vibrates in the direction normal to the longitudinal direction of the structural element passes through the substrates; whereas the electric field vector component of the light that vibrates in the direction parallel to the longitudinal direction of the structural element is reflected by the elements. Thus, the polarizer performs a polarizing function. On the other hand, when the pitch p is larger than the target wavelength of the polarizer, the polarizer mostly performs diffractive optical function, instead of polarizing function.

Since the target light is in deep ultraviolet wavelength region (from 190 nm to 300 nm) in this exemplary embodiment, the pitch p is 300 nm or less. More preferably, the pitch p is 150 nm or less, because the polarizer shows the optimal polarizing function especially when the pitch p is a half or less of the target wavelength.

The periodic structure may be fabricated, for example, by depositing a predetermined metal film on a substrate, forming a resist pattern by electron beam lithography or photolithography, and etching the deposited metal film formed by dry etching. Alternatively, the periodic structure may be fabricated by forming a resist pattern by electron beam lithography or photolithography on a substrate, depositing a predetermined metal film, and selectively removing the deposited metal film by lift-off.

In this exemplary embodiment, the periodic structure 2 is composed of chromium oxide or tungsten. The inventor of the present invention found that the periodic structure composed of aluminum or silver shows a polarizing function for deep ultraviolet light only when the height and the filling factor thereof are considerably reduced. Unfortunately, the reduction is extremely difficult to obtain with commonly used materials, because no polarizer for deep ultraviolet light can be obtained with the materials that have been commonly used. The inventor of the present invention intensively examined with various materials, in view of the above situation. As a result, a periodic structure composed of chromium oxide or tungsten was found to provide a polarizing function for deep ultraviolet light, without considerably reducing the height or the filling factor thereof. The reason for the result obtained by chromium oxide and tungsten instead of the conventional materials is not known yet.

In this exemplary embodiment, a periodic structure is formed on a synthetic quartz substrate. The periodic structure is composed of tungsten, and has a pitch p of 90 nm, a height d of 280 nm, and a filling factor f of 0.37. Table 1 summarizes the specifications of the periodic structures according to this exemplary embodiment, other exemplary embodiments, and comparative examples which will be described later. The polarizer of this exemplary embodiment was designed to have a higher extinction ratio and a higher transmittance for light at the wavelength of 300 nm.

Figure 2:
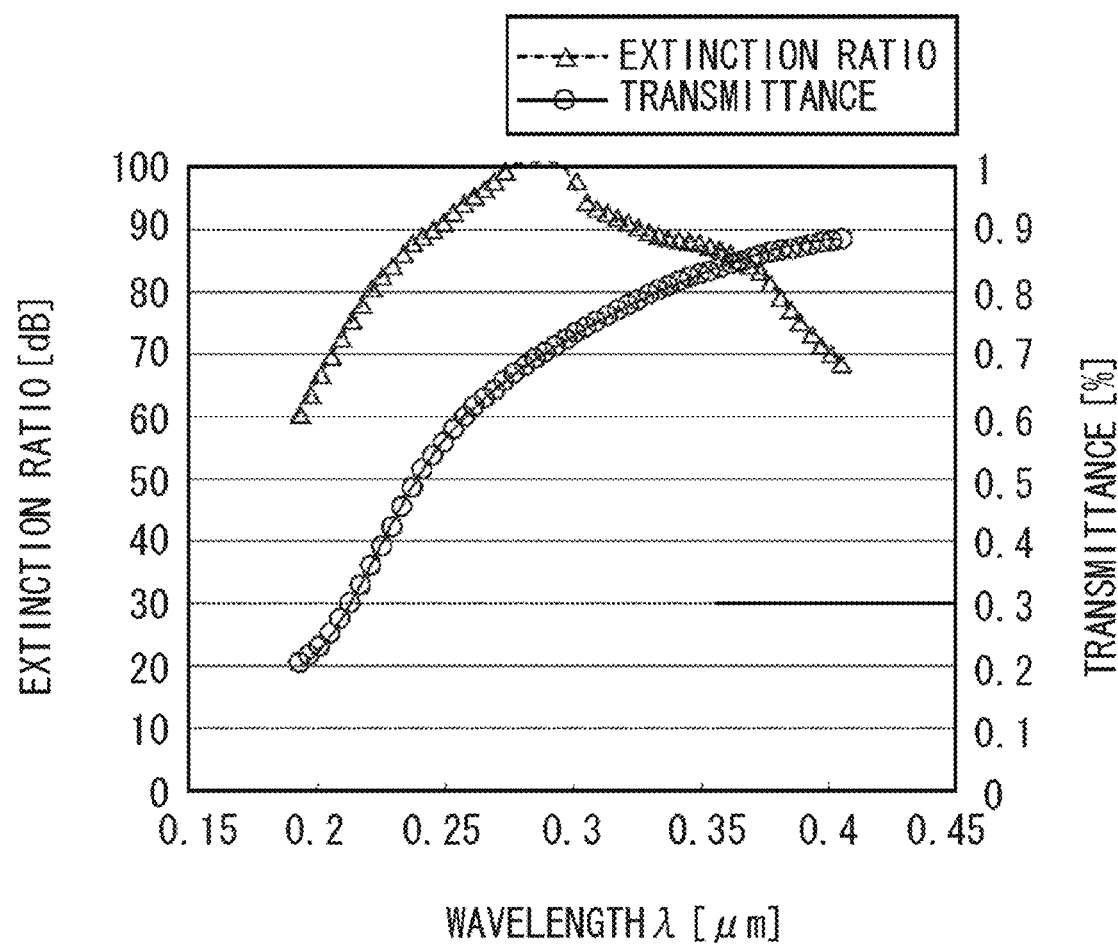
FIG. 2 is a graph illustrating the characteristics of a polarizer according to a first exemplary embodiment of the present invention.

FIG. 2 is a graph illustrating the characteristics of the polarizer according to the first exemplary embodiment, and representing a simulation result. The simulation was performed using Rigorous Coupled Wave Analysis (RCWA) algorithm which is a highly precise captured-image simulation technology based on diffraction analysis. Herein, the extinction ratio γ is defined as 10 $Log_{10}$ ($I_{TM}/I_{TE}$), where $I_{TE}$ is a transmitted light intensity of a transverse electric (TE) wave (light having a polarization orientation parallel to the longitudinal direction of the structural elements), whereas $I_{TM}$' is an transmitted light intensity of a transverse magnetic (TM) wave (light having a polarization orientation orthogonal to the longitudinal direction of the structural elements). As shown in FIG. 2, the polarizer of this exemplary embodiment exhibited the extinction ratio γ of 100 dB or more and the transmittance T of 70% or more for light at the wavelength of 300 nm. The polarizer having a high extinction ratio and a high transmittance was obtained. FIG. 2 also shows that the polarizer exhibited the high extinction ratio γ of 60 dB or more for light in the deep ultraviolet range (from 190 nm to 300 nm). Also for light at the wavelength range of 200 nm or less, the transmittance T decreased to about 20%, but the extinction ratio was 60 dB or more, which is still high.

A polarizer according to a second exemplary embodiment of the present invention has a configuration similar to the first exemplary embodiment, and includes a substrate and a periodic structure formed thereon. In this exemplary embodiment, a periodic structure is formed on a synthetic quartz substrate. The periodic structure is composed of tungsten and has a pitch p of 90 nm, a height d of 350 nm, and a filling factor f of 0.11. The polarizer of this exemplary embodiment is designed to have a higher extinction ratio and a higher transmittance for light at the wavelength of 250 nm.

Figure 3:
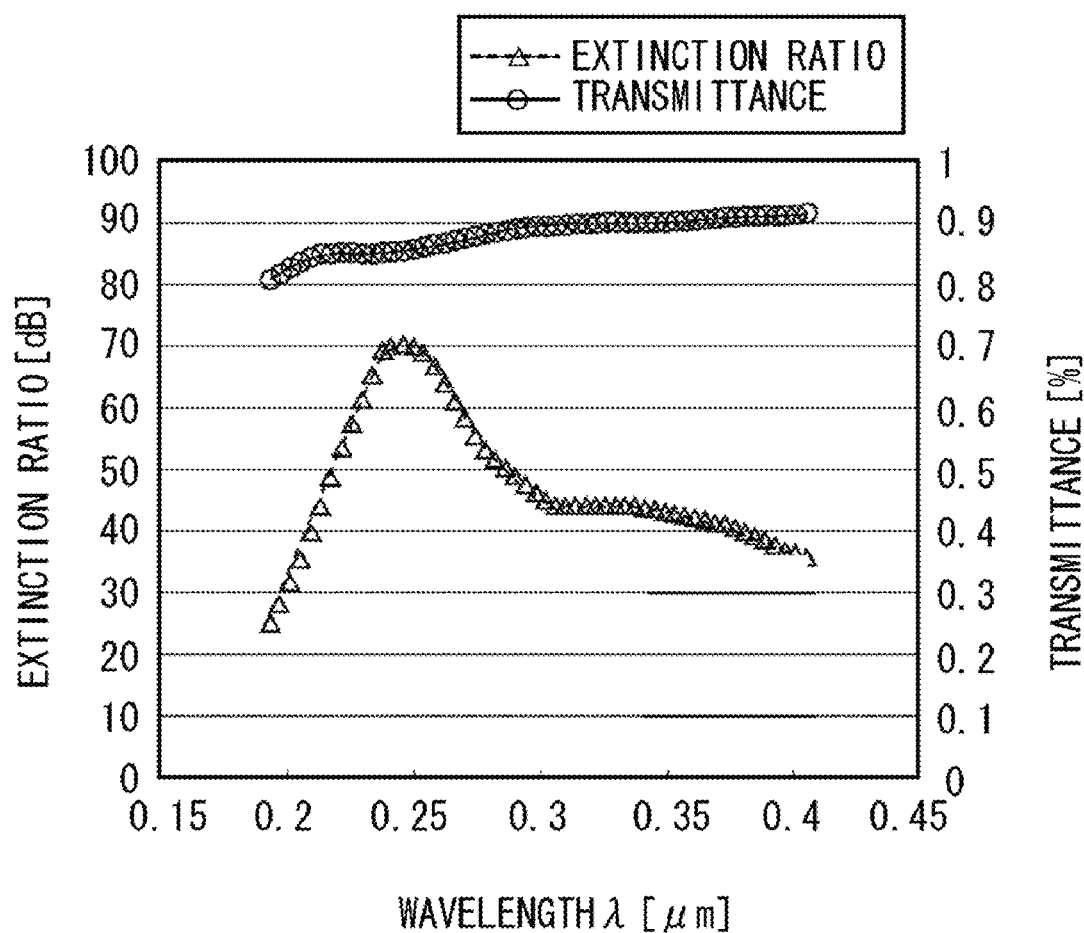
FIG. 3 is a graph illustrating the characteristics of a polarizer according to a second exemplary embodiment of the present invention.

FIG. 3 is a graph illustrating the characteristics of the polarizer according to the second exemplary embodiments, and representing a simulation result. The polarizer of this exemplary embodiment exhibited the extinction ratio γ of over 65 dB and the transmittance T of 80% or more for light at the wavelength of 250 nm. The polarizer having high extinction ratio and a high transmittance was obtained. FIG. 3 also shows that the polarizer exhibited the high transmittance T of 80% or more for light in the deep ultraviolet range (from 190 nm to 300 nm). Also for light at the wavelength range of 200 nm or less, the extinction ratio decreased to about 25 dB, but the transmittance T was 80% or more, which is still high.

A polarizer according to a third exemplary embodiment of the present invention has configuration similar to the first and second exemplary embodiments, and includes a substrate and a periodic structure formed thereon. In this exemplary embodiment, in contrast to the first and second exemplary embodiments, the periodic structure is composed of chromium oxide. The pitch p of the periodic structure is equal to or less than a half of the target wavelength of deep ultraviolet light (300 nm). In this exemplary embodiment, the periodic structure on the substrate of synthetic quartz has a pitch p of 90 nm, a height d of 210 nm, and a filling factor f of 0.28. The polarizer of this exemplary embodiment is designed to have a higher extinction ratio for light at the wavelength of 200 nm.

Figure 4:
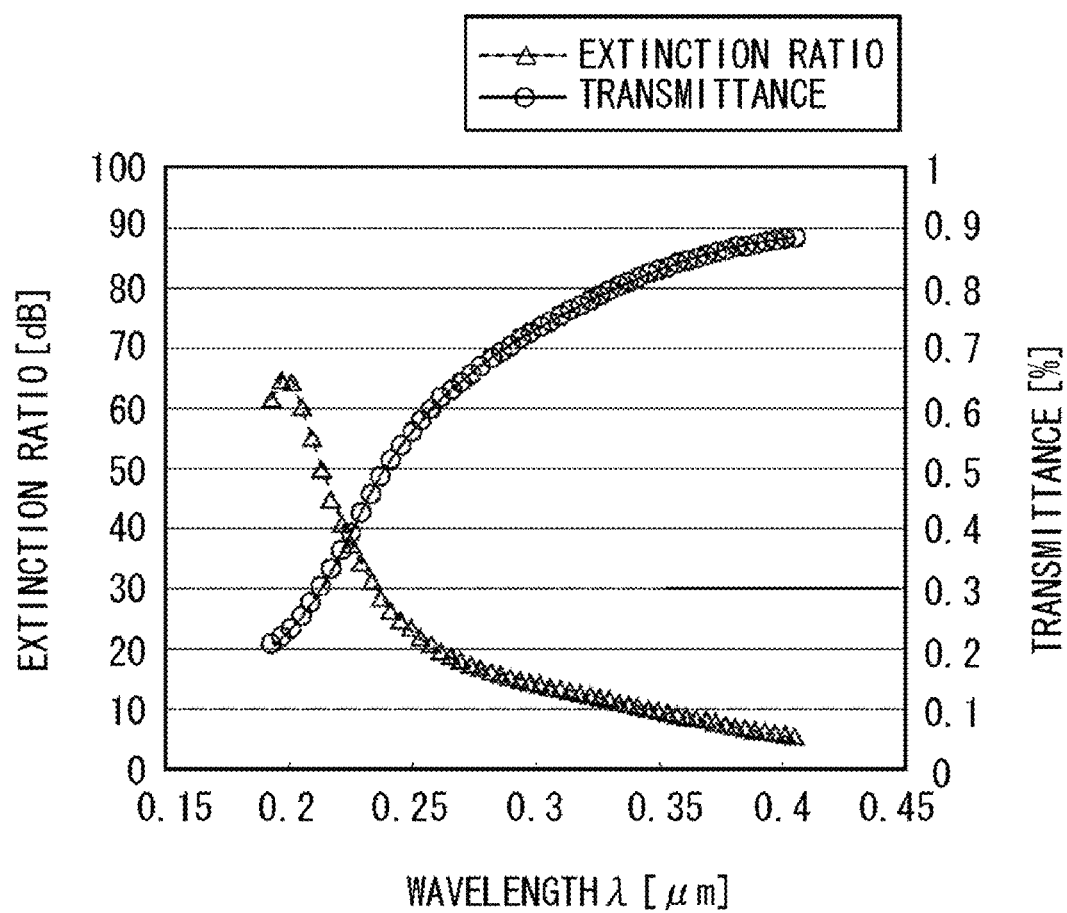
FIG. 4 is a graph illustrating the characteristics of a polarizer according to a third exemplary embodiment of the present invention.

FIG. 4 is a graph illustrating the characteristics of a polarizer according to the third exemplary embodiment of the present invention, and representing a simulation result. The polarizer of this exemplary embodiment exhibited the transmittance T of about 20% and the extinction ratio γ of 60 dB or more for light at the wavelength of 200 nm. The polarizer having a high extinction ratio was obtained. FIG. 4 also shows that the polarizer exhibited the extinction ratio γ of 20 dB or more and the transmittance T of 20% or more for light in the wavelength range of from 190 nm to 250 nm.

A polarizer according to a fourth exemplary embodiment of the present invention has a configuration similar to the third exemplary embodiment, and includes a substrate and a periodic structure formed thereon. In this exemplary embodiment, the periodic structure on the substrate of synthetic quartz is composed of chromium oxide, and has a pitch p of 90 nm, a height d of 230 nm, and a filling factor f of 0.12. The polarizer of this exemplary embodiment is designed to have a higher extinction ratio and a higher transmittance for light at the wavelength of 200 nm.

Figure 5:
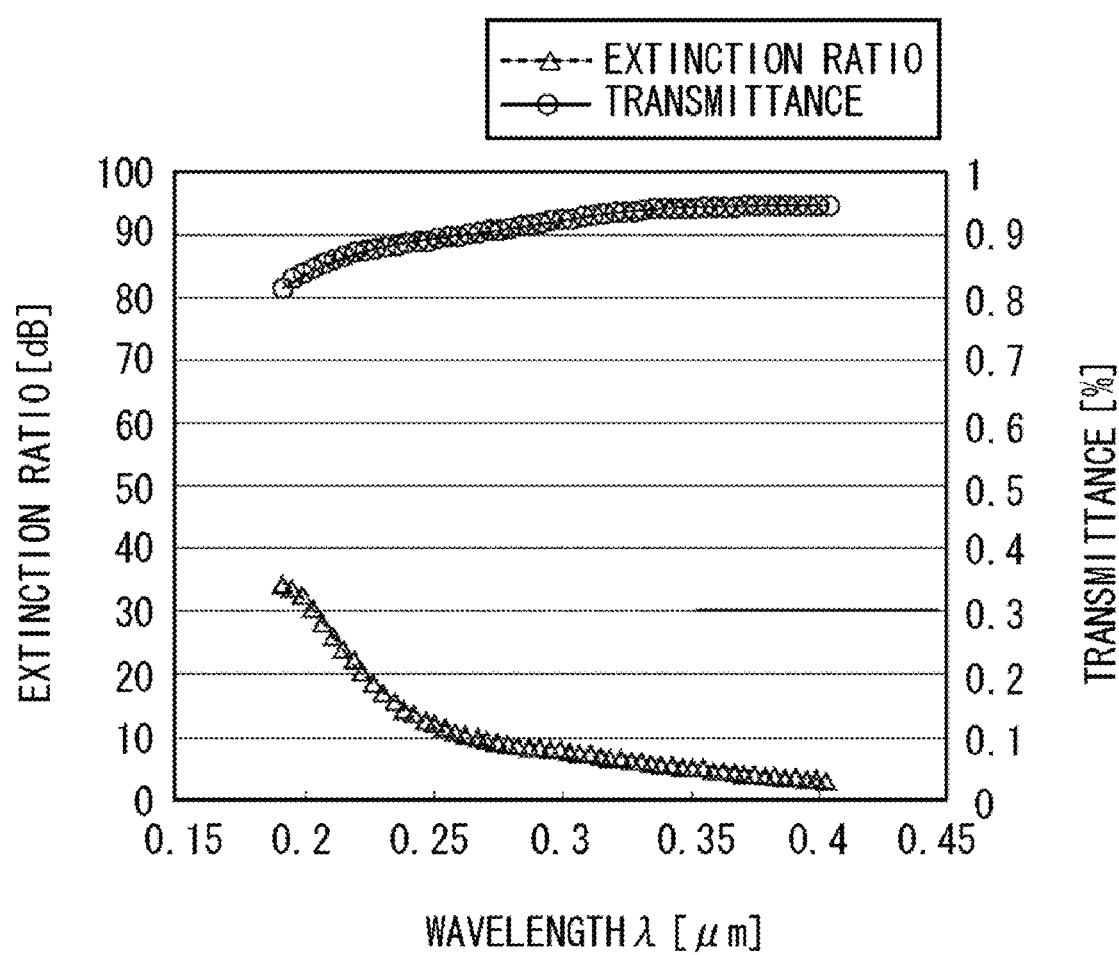
FIG. 5 is a graph illustrating the characteristics of a polarizer according to a fourth exemplary embodiment of the present invention.

FIG. 5 is a graph illustrating the characteristics of the polarizer according to the fourth exemplary embodiment, and representing a simulation result. The polarizer of this exemplary embodiment exhibited the transmittance T of 80% or more and the extinction ratio γ of 30 dB or more for light at the wavelength of 200 nm. The polarizer having a high extinction ratio and a high transmittance was obtained.

A polarizer according to a fifth exemplary embodiment of the present invention has a configuration similar to the third exemplary embodiment, and includes a substrate and a periodic structure formed thereon. In this exemplary embodiment, the periodic structure on the substrate of synthetic quartz is composed of chromium oxide, and has a pitch p of 150 nm, a height d of 370 nm, and a filling factor f of 0.15. The polarizer of this exemplary embodiment is designed to have a higher extinction ratio and a higher transmittance for light at the wavelength of 250 nm.

Figure 6:
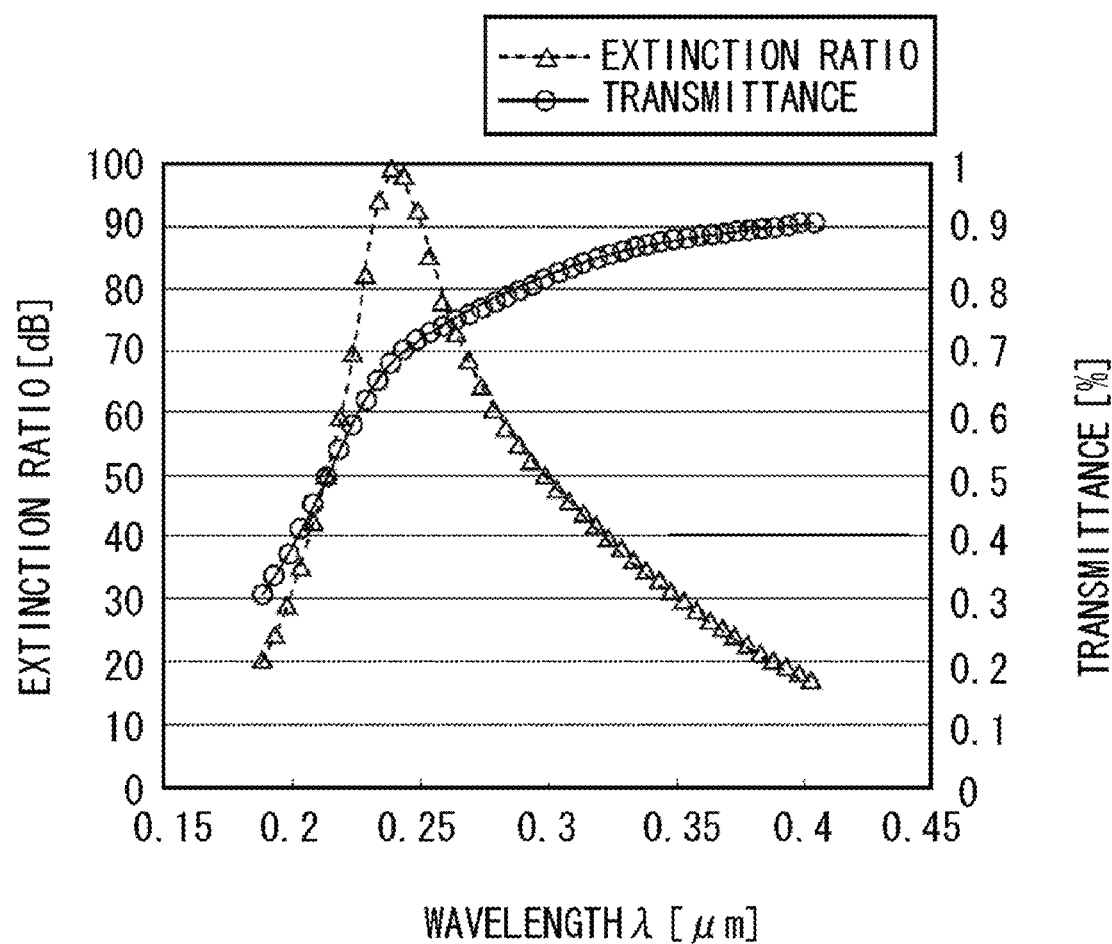
FIG. 6 is a graph illustrating the characteristics of a polarizer according to a fifth exemplary embodiment of the present invention.

FIG. 6 is a graph illustrating the characteristics of the polarizer according to the fifth exemplary embodiment, and representing a simulation result. The polarizer of this exemplary embodiment exhibited the transmittance T of 70% or more and the extinction ratio γ of about 45 dB for light at the wavelength of 250 nm. The polarizer having a high extinction ratio and a high transmittance was obtained. FIG. 6 also shows that the polarizer exhibited the extinction ratio γ of 20 dB or more and the transmittance T of 20% or more for light in the wavelength range of from 210 nm to 300 nm.

A polarizer according to a sixth exemplary embodiment of the present invention has a configuration similar to the third exemplary embodiment, and includes a substrate and a periodic structure formed thereon. In this exemplary embodiment, the periodic structure on the substrate of synthetic quartz is composed of chromium oxide, and has a pitch p of 80 nm, a height d of 200 nm, and a filling factor f of 0.17. The polarizer of this exemplary embodiment is designed to have a higher extinction ratio and a higher transmittance for light at the wavelength of 200 nm.

Figure 7:
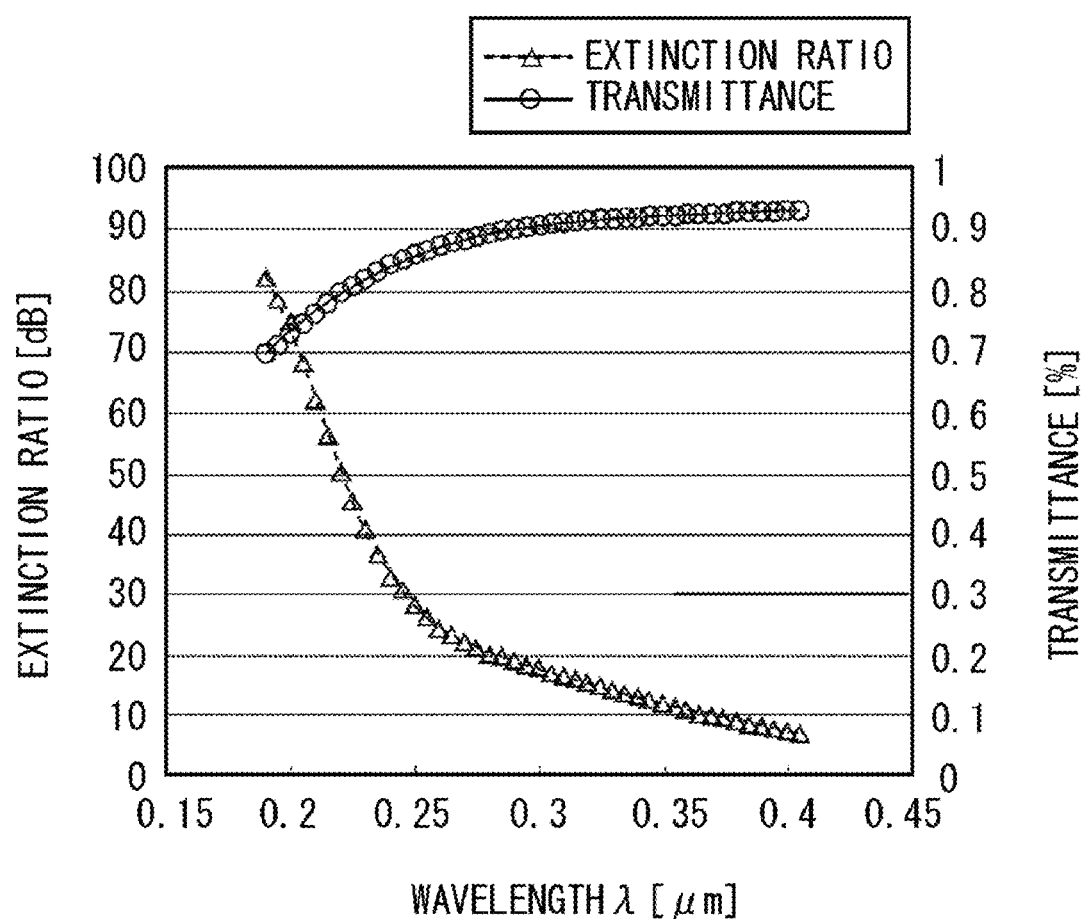
FIG. 7 is a graph illustrating the characteristics of a polarizer according to a sixth exemplary embodiment of the present invention.

FIG. 7 is a graph illustrating the characteristics of the polarizer according to the sixth exemplary embodiment, and representing a simulation result. The polarizer of this exemplary embodiment exhibited the extinction ratio γ of 35 dB or more and the transmittance T of 80% or more for light at the wavelength of 250 nm. The polarizer having a high extinction ratio and a high transmittance was obtained.

A polarizer according to a first comparative example has a configuration similar to the fourth exemplary embodiment, and includes a substrate and a periodic structure formed thereon. The periodic structure has a pitch p of 90 nm, a height d of 230 nm, and a filling factor f of 0.12, which are equal to those of the forth exemplary embodiment, respectively. In this comparative example, in contrast to the fourth exemplary embodiment, the periodic structure is composed of aluminum.

Figure 8:
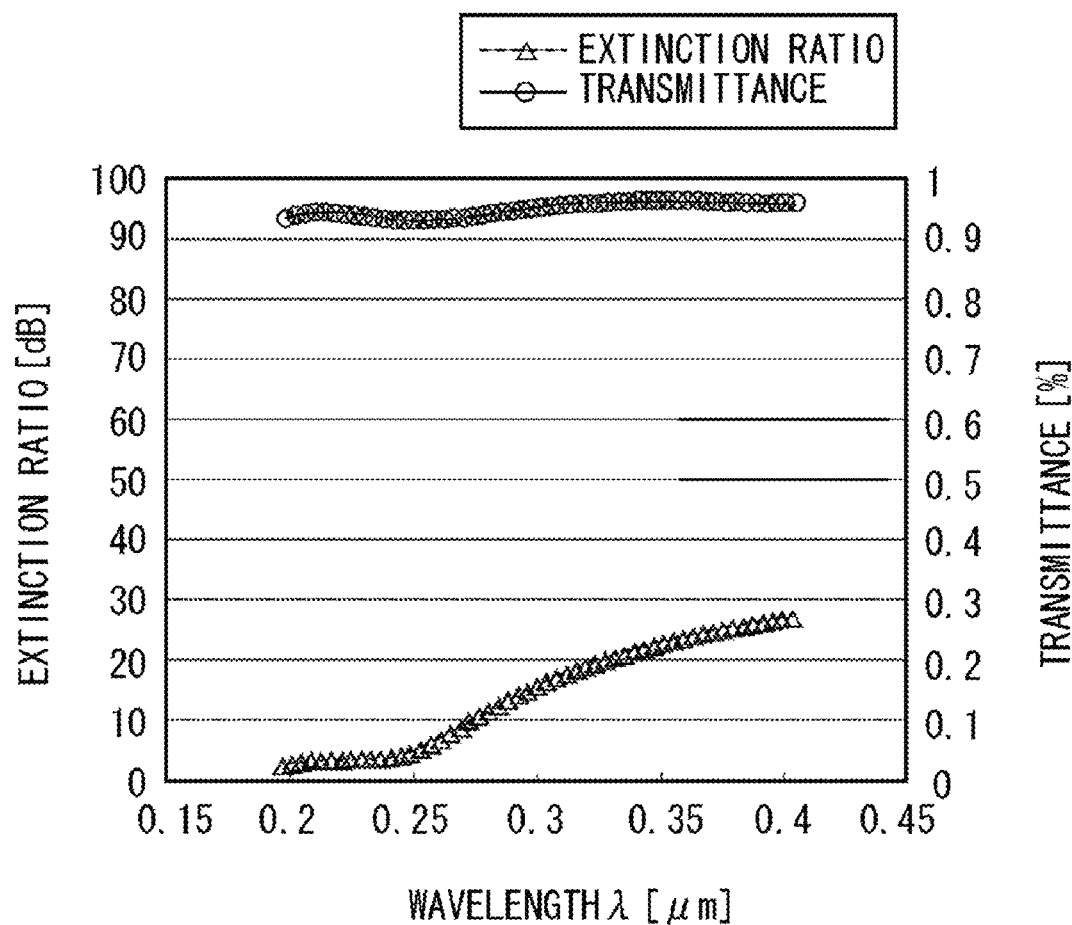
FIG. 8 is a graph illustrating the characteristics of a polarizer according to a first comparative example of the present invention.

FIG. 8 is a graph illustrating the characteristics of the polarizer according to the first comparative example, and representing a simulation result. The polarizer of this comparative example exhibited the transmittance T of 90% or more but with the poor extinction ratio γ of 5 dB or less for light at a wavelength of 200 nm. The polarizer having a high extinction ratio was not obtained. FIG. 8 also shows no polarization characteristics was obtained for light in the deep ultraviolet range of from 190 nm to 300 nm.

A polarizer according to a second comparative example has a configuration similar to the fourth exemplary embodiment and the first comparative example, and includes a substrate and a periodic structure formed thereon. In this comparative example, the periodic structure on the substrate of synthetic quartz is composed of aluminum, and has a pitch p of 90 nm, a height d of 20 nm, and a filling factor f of 0.026. The polarizer of this comparative example is designed to have a higher extinction ratio and a higher transmittance for light at the wavelength of 200 nm, as in the forth exemplary embodiment.

Figure 9:
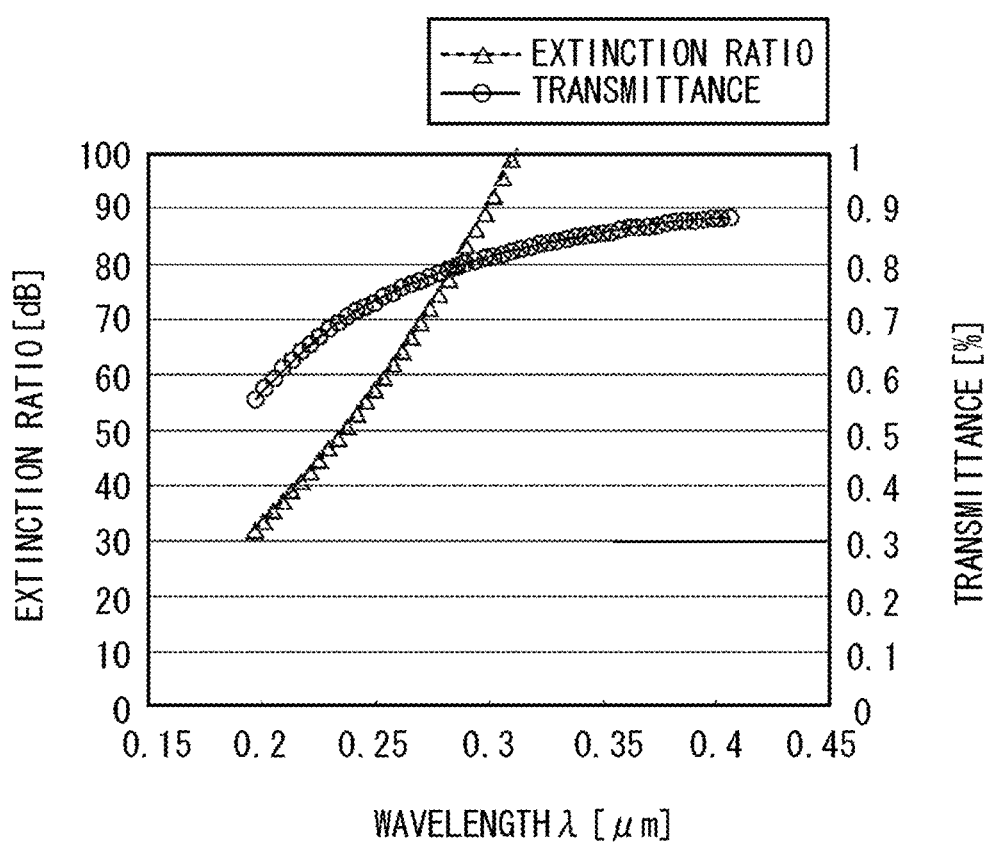
FIG. 9 is a graph illustrating the characteristics of a polarizer according to a second comparative example of the present invention.

FIG. 9 is a graph illustrating the characteristics of the polarizer according to the second comparative example, and representing a simulation result. Conditions that this comparative example can function as a polarizer was obtained based on a simulation. The polarizer of this comparative example exhibited the transmittance T of about 50% and the extinction ratio γ of 30 dB or more for light at the wavelength of 200 nm. The polarizer having a high extinction ratio was obtained. The actual construction of periodic structure of this comparative example, however, is extremely difficult to realize, because the materials conventionally used cannot provide a polarizer for deep ultraviolet light.

TABLE 1

| | Grid Section | p (nm) | d (nm) | f |
|---|---|---|---|---|
| Exemplary embodiment 1 | tungsten | 90 | 280 | 0.37 |

TABLE 1-continued

| | Grid Section | p (nm) | d (nm) | f |
|---|---|---|---|---|
| Exemplary embodiment 2 | tungsten | 90 | 350 | 0.11 |
| Exemplary embodiment 3 | chromium oxide | 90 | 210 | 0.28 |
| Exemplary embodiment 4 | chromium oxide | 90 | 230 | 0.12 |
| Exemplary embodiment 5 | chromium oxide | 150 | 370 | 0.15 |
| Exemplary embodiment 6 | chromium oxide | 80 | 200 | 0.17 |
| Comparative embodiment 1 | aluminum | 90 | 230 | 0.12 |
| Comparative example 2 | aluminum | 90 | 20 | 0.026 |

The polarizer according to an exemplary embodiment of the present invention can be used in polarized-light illumination systems of semiconductor and liquid crystal exposure equipment, polarization control systems of laser lithography systems, polarization sensors of polarization meters, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-291105 filed Nov. 13, 2008, which is hereby incorporated by reference herein in its entirety.

What is claimed is:

1. A polarizer comprising:
a substrate transparent to light having a target wavelength in deep ultraviolet light wavelength range; and
a periodic structure including a plurality of structural elements arranged at predetermined intervals on the substrate,
wherein each of the plurality of structural elements consists of chromium oxide, the plurality of structural elements have a pitch not greater than the target wavelength, the plurality of structural elements have a filling factor greater than 0.1, and each of the plurality of structural elements has a height not less than 100 nm, so that the polarizer brings out, from the light having the target wavelength incident thereon, a component having a polarization direction that is orthogonal to a longitudinal direction of each of the plurality of structural elements.

2. The polarizer according to claim 1, wherein the plurality of structural elements have a pitch not greater than a half of the target wavelength.

3. The polarizer according to claim 1, wherein the substrate comprises fluorite or fluorine-doped quartz glass.

4. A polarizer comprising:
a substrate transparent to light having a target wavelength in deep ultraviolet light wavelength range; and
a periodic structure including a plurality of structural elements arranged at predetermined intervals on the substrate,
wherein each of the plurality of structural elements consists of chromium oxide, the plurality of structural elements have a pitch not greater than the target wavelength, the plurality of structural elements have a filling factor greater than 0.1, and each of the plurality of structural elements has a height not less than 200 nm, so that the polarizer brings out, from the light having the target wavelength incident thereon, a component having a polarization direction that is orthogonal to a longitudinal direction of each of the plurality of structural elements.

5. A polarizer comprising:
a substrate transparent to light having a target wavelength in deep ultraviolet light wavelength range; and
a periodic structure including a plurality of structural elements arranged at predetermined intervals on the substrate,
wherein each of the plurality of structural elements consists of chromium oxide, the plurality of structural elements have a pitch not greater than the target wavelength, the plurality of structural elements has a filling factor greater than 0.1, and each of the plurality of structural elements has a height not less than the target wavelength, so that the polarizer brings out, from the light having the target wavelength incident thereon, a component having a polarization direction that is orthogonal to a longitudinal direction of each of the plurality of structural elements.

* * * * *